United States Patent [19]

Colineau

[11] Patent Number: 4,621,281
[45] Date of Patent: Nov. 4, 1986

[54] VIDEO IMAGE PROJECTING SYSTEM WITH SEPARATE PROJECTING DEVICES FOR PROJECTING A BACKGROUND COMPONENT AND SHARP CONTOURS OF AN IMAGE

[75] Inventor: Joseph Colineau, Seiches sur Loir, France

[73] Assignee: Societe d'Electronique de la Region Pays de Loire Serel, Paris, France

[21] Appl. No.: 603,245

[22] Filed: Apr. 23, 1984

[30] Foreign Application Priority Data

Apr. 26, 1983 [FR] France ................................. 83 06831

[51] Int. Cl.[4] .......................... H04N 9/31; H04N 9/16; H04N 5/74
[52] U.S. Cl. ........................................ 358/60; 358/64; 358/231; 358/237
[58] Field of Search .................... 358/56, 60, 61, 62, 358/63, 64, 230, 231, 232, 233, 234, 235, 236, 237, 238, 239

[56] References Cited

U.S. PATENT DOCUMENTS

| 2,953,635 | 9/1960 | DeGier ................................ 358/60 |
| 3,006,990 | 10/1961 | Harries ............................... 358/60 |
| 4,456,923 | 6/1984 | Annegarn et al. ................. 358/60 |

FOREIGN PATENT DOCUMENTS

| 37630 | 3/1979 | Japan ................................. 358/237 |
| 156425 | 12/1979 | Japan ................................. 358/60 |
| 52686 | 4/1980 | Japan ................................. 358/60 |
| 115782 | 9/1980 | Japan ................................. 358/60 |

Primary Examiner—James J. Groody
Assistant Examiner—Randall S. Svihla
Attorney, Agent, or Firm—Roland Plottel

[57] ABSTRACT

The video image projection system of the invention includes two projecting devices formed by cathode ray tubes for projecting a green color onto a projection surface and two other projecting devices for projecting red and blue colors. The two green projecting devices project superimposed images. A circuit is provided for processing a video signal to supply a background signal without fine details to one of the green projection devices and a sharp contour signal to the other green projection device.

20 Claims, 26 Drawing Figures

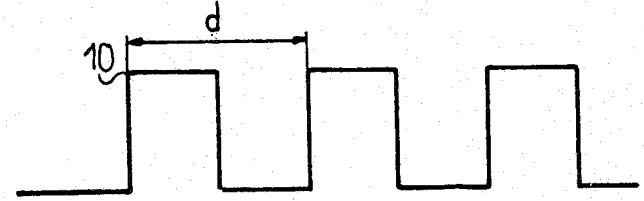
FIG_1-a
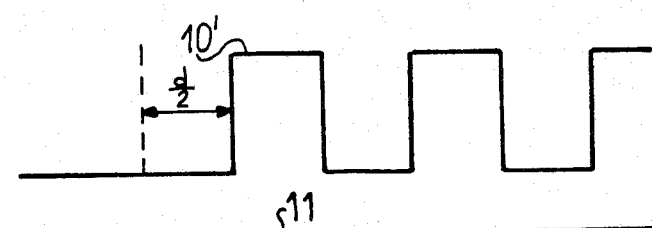
FIG_1-b
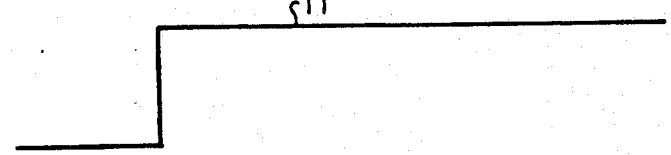
FIG_1-c
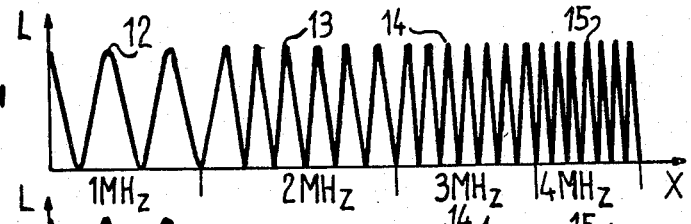
FIG_2-a
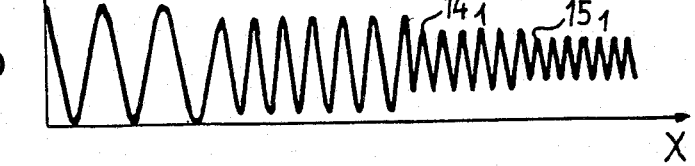
FIG_2-b
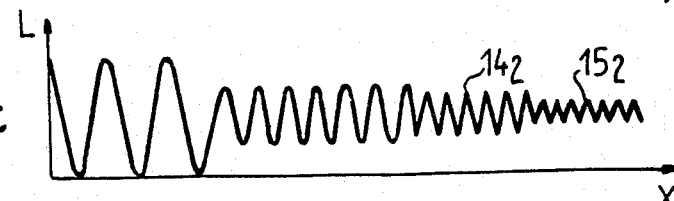
FIG_2-c
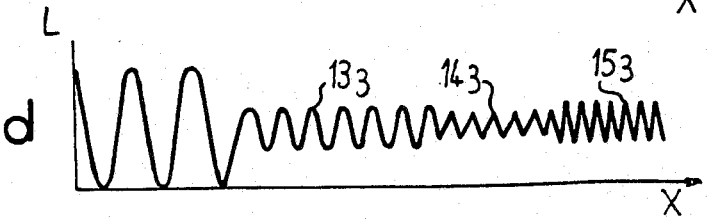
FIG_2-d

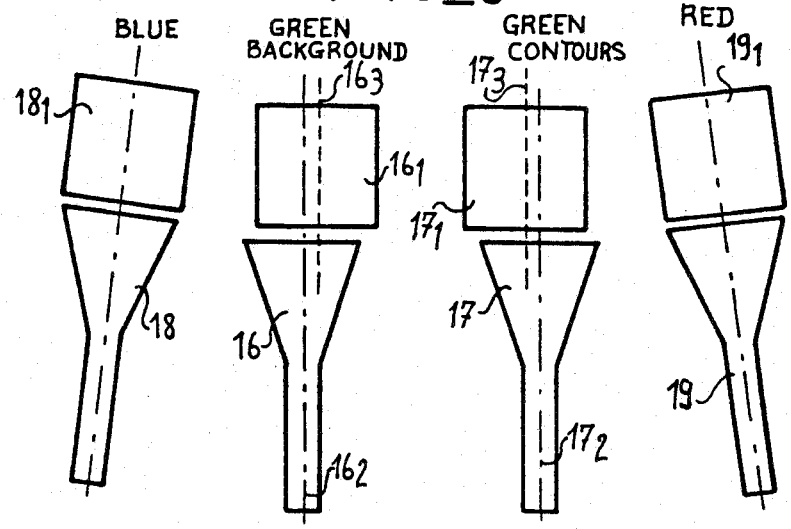
FIG_3
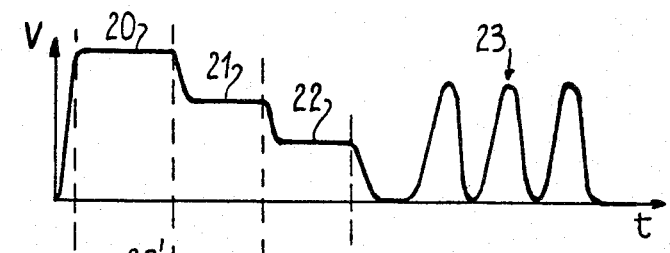
FIG_4-a
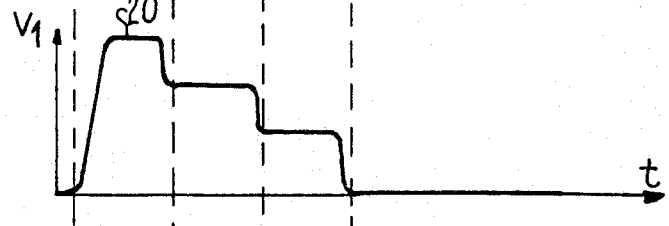
FIG_4-b
(TUBE 16)
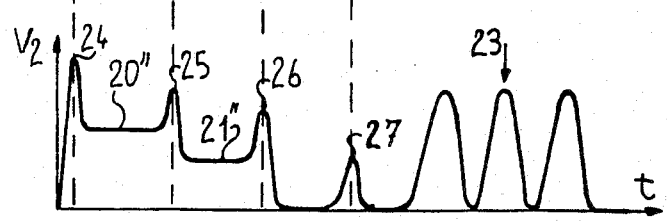
FIG_4-c
(TUBE 17)

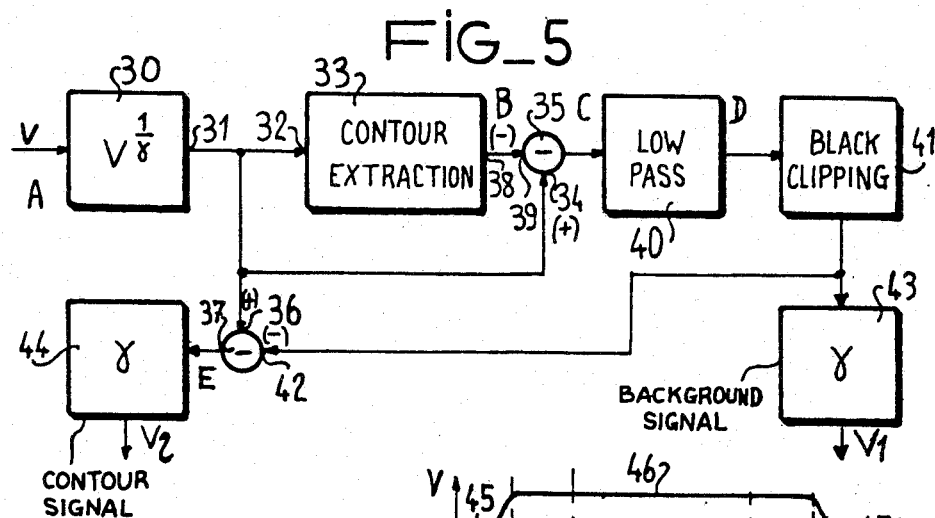
FIG_5
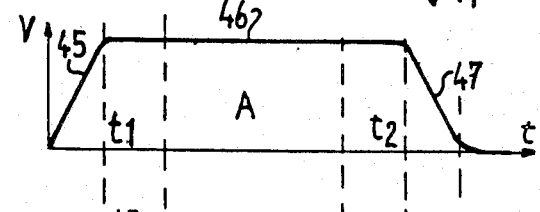
FIG_6-a
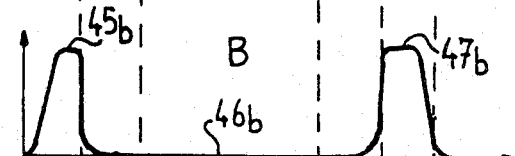
FIG_6-b
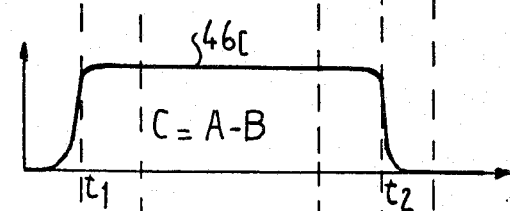
FIG_6-c
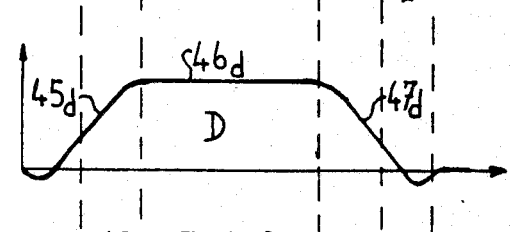
FIG_6-d
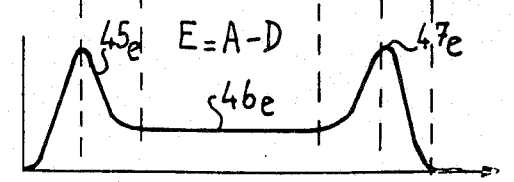
FIG_6-e

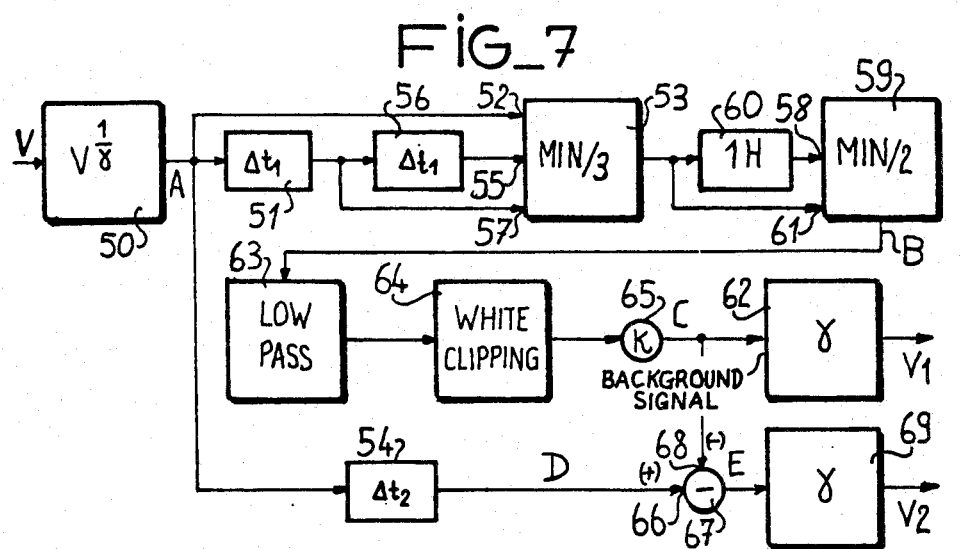
FIG_7
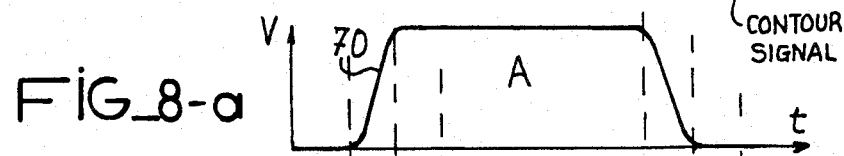
FIG_8-a
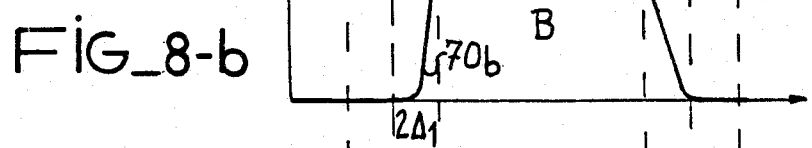
FIG_8-b
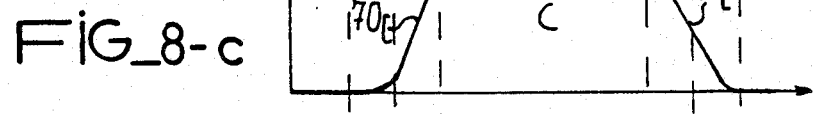
FIG_8-c
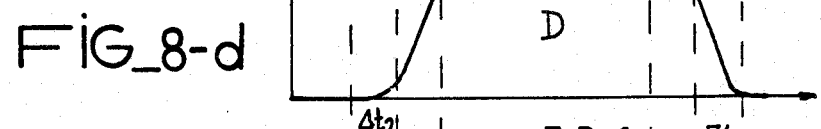
FIG_8-d
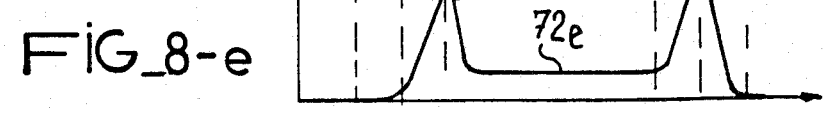
FIG_8-e

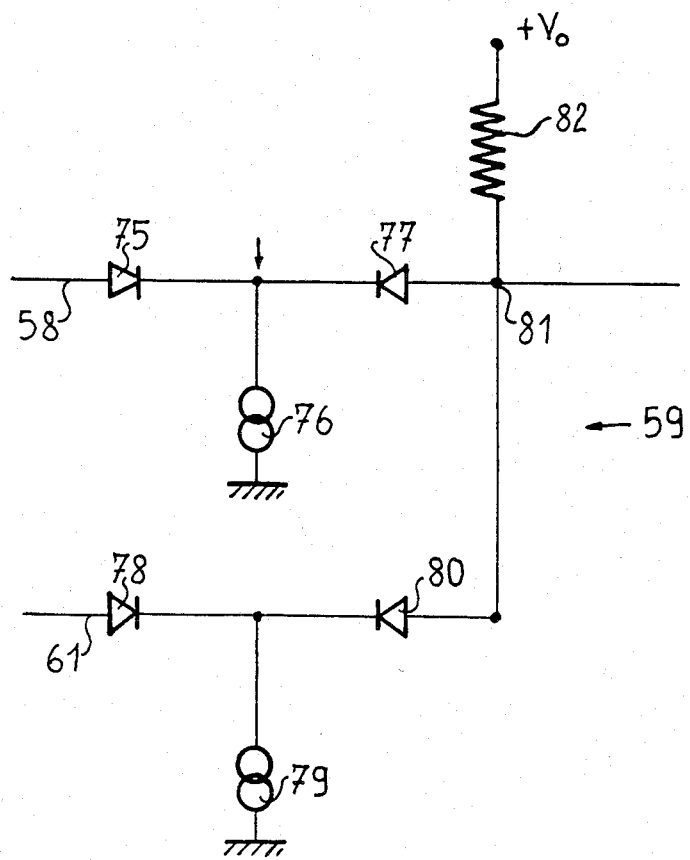

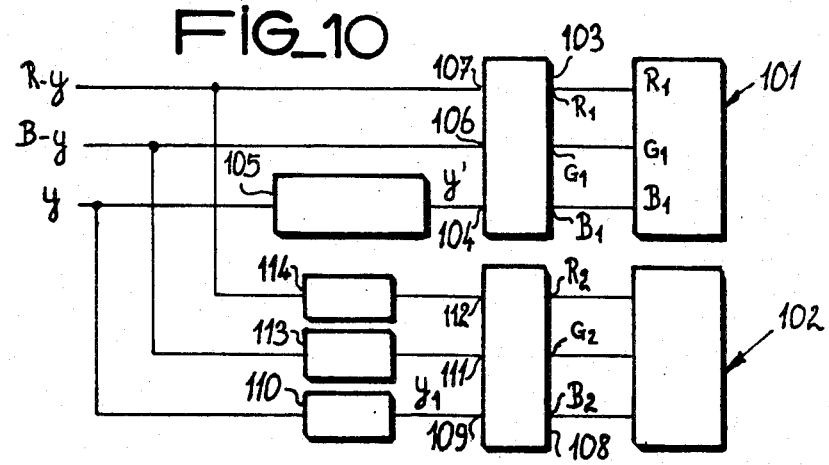
FIG_10
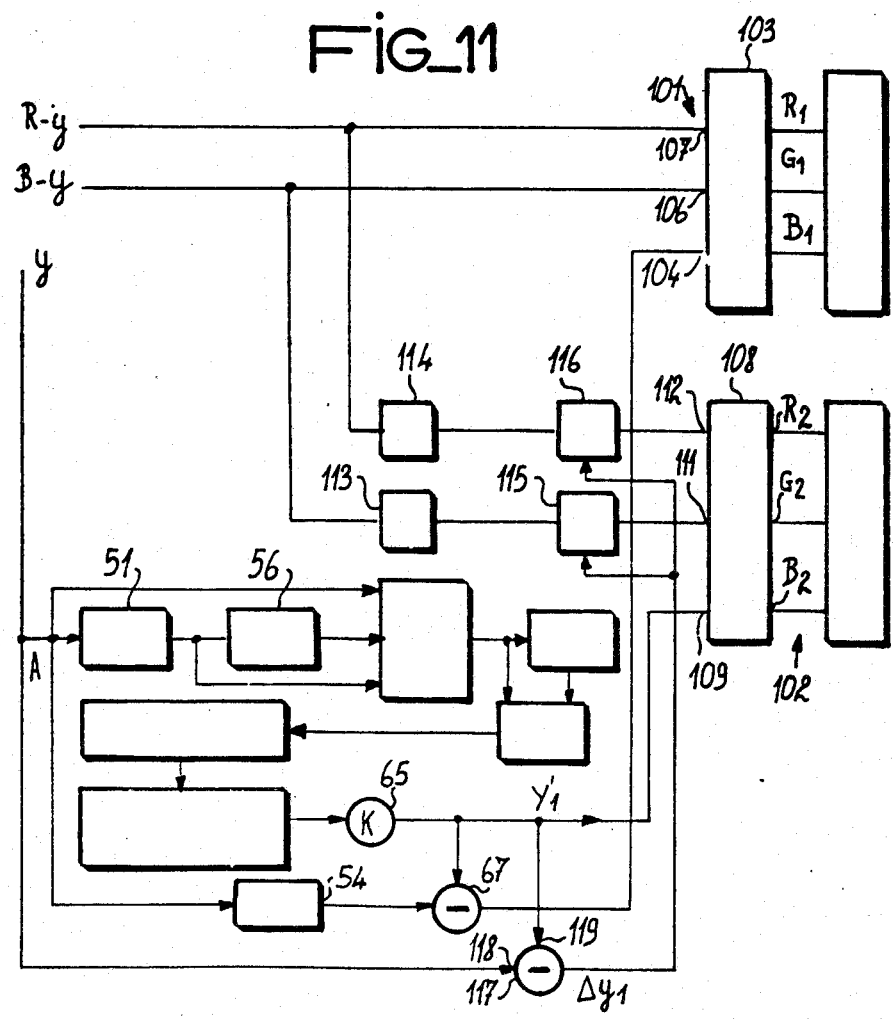
FIG_11

VIDEO IMAGE PROJECTING SYSTEM WITH SEPARATE PROJECTING DEVICES FOR PROJECTING A BACKGROUND COMPONENT AND SHARP CONTOURS OF AN IMAGE

BACKGROUND OF THE INVENTION

The invention relates to an apparatus for projecting video images or pictures in color onto a large screen. There are several different types of such apparatus, which are generally called video projectors. The most commonly found involves an objective or lens projecting the image onto the large screen. The image or picture is supplied by three monochrome television tubes, each tube forming an image of one of the three primary colors. There are also video projectors with an optical modulator interposed between a light source and the screen.

The disadvantage of video projectors of the first type is that the image obtained on the large screen is not very bright and has limited resolution. Thus, the luminous flux reaching the screen is at most 150 lumens in the known video projectors. It is difficult to increase the flux without exceeding the limiting temperature for heating the phosphor strips of the tubes and the generally plastic lenses. It is certainly possible to increase the luminous flux by cooling the tubes, but a cooling installation is complicated and cumbersome.

SUMMARY OF THE INVENTION

The invention, which applies to all video projector types, makes it possible to increase the brightness of the picture on the large screen without any resolution loss.

Thus, the apparatus is of the type having at least two devices (such as television tubes) for projecting superimposed images. A circuit for processing a video signal is also provided. One of the two projecting devices supplies a background image without fine details. The other of the two projecting devices supplies an image to complement the image supplied by the first device and superimposed thereon in which the contours predominate, i.e. the brightness transitions of the image.

The superimposing of a sharp image, mainly formed by contours, and a hazy image (i.e., one without fine details) obviously makes it possible to increase the brightness of the picture, merely through the duplication of the projecting devices. Howver, it is of particular interest to note that the images projected by these two devices allow a relatively large displacement without losing any resolution.

Thus, if two projection devices supplied identical images, each containing both the background and the contours, a high degree of precision would be required when superimposing the projected images in order to ensure adequate resolution. Such precision in superimposing two identical images, is necessary in order to retain good resolution and is much greater than the precision necessary for superimposing, without resolution loss, two non-identical images, e.g. having different colors. However displacement tolerances of the projected images are relatively large when using this invention.

In a preferred embodiment, the two projection devices are provided in such a way that the dissipated power is distributed equally for the highlight levels. In the case of medium or low levels, the projecting device producing the background without the fine details withstands a higher power than the other projection device, particularly if the latter only projects sharp contours. Therefore, there is a high maximum flux and the resolution is excellent for limited illuminations.

In a first example, for producing signals representing the contours, a contour extraction circuit is provided, which processes the first derivative of the video signal on the basis of which is produced the contour signal and the background signal. The background signal thus corresponds to the difference between the video signal and the contour signal.

In a second example, the background signal is processed by scanning the brightness in a small area surrounding a scanned point. The background is then constituted by the brightness minimum in that area. The contour signal is the difference between the video signal and the background signal.

In one example, each projection device is a video projector, constituted by three monochrome tubes, respectively red R, green G and blue B. In this case, in order to supply the background signal of the image, it may be sufficient for the processing circuit to only impact the luminance signal Y and not the signals R-Y and B-Y.

The invention also applies in the case of a video projector in which a monochrome projection device is duplicated, i.e. when there are two projection devices for the same color.

In this case, if only one of the monochrome projection devices is duplicated, it is preferably that producing the greatest luminous flux, or that subject to the greatest thermal stresses. Thus, in the case of monochrome cathode ray tubes, the tube emitting green light will be duplicated, because this is the tube which participates most in the illumination of the screen.

BRIEF DESCRIPTION OF THE DRAWINGS

The invention is described in greater detail hereinafter relative to nonlimitative embodiments and with reference to the attached drawings, in which FIGS. 1a, 1b, 1c, 2a, 2b, 2c and 2d are graphs illustrating that the superimposing of two identical images of the same color necessitates a high degree of precision.

FIG. 3 is a diagram of part of the apparatus according to the invention.

FIG. 4a to 4c are diagrams showing the processing of signals applied to two cathode ray tubes of the same color according to the invention.

FIG. 5 is a diagram of a circuit according to the invention.

FIGS. 6a to 6e are graphs for illustrating the operation of the circuit of FIG. 5.

FIG. 7 is a diagram for a circuit according to the invention, based on a different principle from that of FIG. 5.

FIGS. 8a to 8e are graphs showing the operation of the circuit of FIG. 7.

FIG. 9 is a diagram of part of the circuit of FIG. 7.

FIG. 10 is a diagram of the processing circuit for a variation of the invention.

FIG. 11 is a processing circuit diagram, but for a different variation.

DETAILED DESCRIPTION OF THE INVENTION

FIG. 1a shows the variation in the brightness of the screen over part of a line (television scanning) on projecting regularly spaced light bars. The repetition period is shown as distance "d". The light portion is shown as a pulse 10.

If a second tube of the same color projects the same image onto the screen with a horizontal displacement equal to d/2, the pulses 10' corresponding to a light portion of the second tube will appear in the intervals separating the pulses 10. In this case, where the width of each light portion is at least equal to d/2, a uniform illumination on the screen is obtained, in the manner shown in FIG. 1c.

Thus, even a slight displacement between the projected images, leads to a resolution loss, which can be significant. It is possible to even better evaluate the resolution loss by examining the diagrams of FIGS. 2a to 2d.

FIG. 2a shows the signal applied to two monochrome tubes of the same color projecting their images onto the same square screen of side length 2 m. This signal corresponds to a multiburst pattern formed from several rows of bars, the spacing between the bars being constant in the same row. The signal comprises one MHz pulses 12, two MHz pulses 13, three MHz pulses 14 and four MHz pulses 15.

If the two tubes project the images in a perfectly superimposed manner onto the screen, the brightness thereon will vary precisely in accordance with FIG. 2a.

However, if these two projections have a horizontal displacement of 3 mm, an illumination will be obtained on the screen which will vary in the manner shown in FIG. 2b, i.e. the three and four MHz pulses $14_1$ and $15_1$ will be attenuated, the pulses 15 corresponding to the closest together lines undergoing the greatest attenuation.

If the displacement is 4.5 mm (FIG. 2c), lines $15_2$ corresponding to four MHz pulses will be virtually invisible on the screen and the lines $14_2$ corresponding to the three MHz pulses will be even more attenuated.

If the horizontal displacement between the projections is 6 mm, it can be seen in FIG. 2d that the lines $14_3$ corresponding to the three MHz pulses are invisible, the lines $15_3$ corresponding to the 4 MHz pulses are attenuated, as are the lines $13_3$ corresponding to the 2 MHz pulses.

The apparatus according to the invention, which has two monochrome tubes of the same color, makes it possible to perfectly restore the pattern of FIG. 2a, even in the case of displacements greater than 7 mm between the projected images.

In the example shown in FIG. 3, the invention includes four monochrome cathode ray tubes, namely a first tube 16, whose screen is covered with luminescent substances only emitting green light, a second tube 17, identical to tube 16, and positioned alongside the latter and on either side of the group formed by these two green tubes and specifically on the side of tube 16, a third tube 18 supplying a blue image and on the side of tube 17 a fourth tube 19 supplying a red image. With each of these tubes is associated an objective or lens $16_1$ to $19_1$, which serves to project the image formed by the corresponding tube onto the not shown screen.

The optical axis of lens $18_1$ coincides with the axis of tube 18. In the same way, the optical axis of lens $19_1$ coincides with the axis of tube 19. However, the axis $16_2$ of tube 16 is displaced, whilst remaining parallel thereto, with respect to axis $16_3$ of lens $16_1$. Axis $17_2$ of tube 17 is parallel to axis $16_2$ and is also displaced relative to axis $17_3$ of lens $17_1$, said axis $17_3$ being parallel to axis $17_2$. The axes of lens $18_1$ and $19_1$ are not parallel to axes $16_3$ and $17_3$.

The displacement of axis $16_2$ relative to axis $16_3$ and axis $17_2$ relative to axis $17_3$ makes it possible to make the images produced by tubes 17, 16 converge on the screen located in the focal plane of these lenses. The axes of lenses $18_1$ and $19_1$ converge onto the screen.

The juxtaposed arrangement with parallel axes of the two green tubes 16, 17 minimizes the geometrical distortions, as well as those due to the influence of the magnetic fields.

According to the invention, the green tube 16 is arranged to define and project the background of the image without fine details, while tube 17 defines and projects the sharp contours of the image and only contributes to a limited extent to the background.

This background and contour signal separation is shown in FIGS. 4a to 4c.

The graph of FIG. 4a shows a video signal V corresponding to an image having uniform zones 20, 21, 22 and fine details 23.

Tube 16 is supplied by a signal $v_1$ (FIG. 4b) for defining and projecting the background of the image, i.e. from which are eliminated sudden transitions, namely the fine details 23, as well as the rising and falling fronts of the uniform zones 20, 21, 22. Thus, zone 20' is narrower than zone 20 of the complete signal.

The graph of FIG. 4c shows the signal V2 supplying tube 17, which is the complement of the signal of FIG. 4b relative to the signal of FIG. 4a and it supplies pulses 24, 25, 26, 27 for the rising and falling fronts of the signals of zones 20, 21 and 22. The pulses 23 are integrally restored. However, zones 20 and 21 are partly restored (signals 20" and 21"), because for high luminous energies, it is preferable to distribute the power of the two tubes 16, 17. However, for medium illumination levels, such as the level of zone 22, as well as for low levels, tube 17 does not contribute to the restoration of the light background.

Prior to the description of two embodiments (FIGS. 5 and 7) of the supply circuits of green tubes 16, 17, it is worth pointing out for a better understanding of these circuits, that the following relation must be satisfied:

$$L(x,y) = L_1(x,y) + L_2(x,y)$$

L(x,y) being the brightness of the image to be produced on the screen, $L_1(x,y)$ and $L_2(x,y)$ being the brightnesses produced on the screen by tubes 16, 17 respectively.

However, the projection tubes do not have a linear characteristic, i.e. the brightness produced does not vary proportionally to the video signal V and instead follows the following relation:

$$L(x,y) = K v^{1/\gamma}(x,y)$$

in which $\gamma$ is called the "gamma" of the tube and K is a constant, which leads to:

$$v^{1/\gamma}(x,y) = v_1^{1/\gamma}(x,y) + v_2^{1/\gamma}(x,y)$$

In addition, the signals $v_1$ and $v_2$ must both be positive or zero, if the black level and the direction of the video signal are correctly chosen.

The circuit shown in FIG. 5 firstly comprises a circuit 30 for raising to the power $1/\gamma$, i.e. carrying out a reverse gamma correction and which receives at its input the video signal v, whereof an example A is shown in the graph of FIG. 6a. The output signal 31 of circuit 30 is consequently proportional to the brightness. This output 31 is connected, on the one hand, to input 32 of a contour extraction circuit 33, and on the other hand, to the positive input 34 of a subtractor 35 and, finally on the other hand, to the positive input 36 of another subtractor 37.

At its output 38, circuit 33 supplies a signal proportional to the absolute value of the first derivative of the video signal. FIG. 6b shows the signal B obtained at the output 38 of circuit 33, when signal v at the input of circuit 30 is that of FIG. 6a. This output 38 of circuit 33 is connected to the negative input 39 of subtractor 35. Signal C obtained at the output of subtractor 35 is shown in FIG. 6c.

This output of subtractor 35 is connected to the input of a low-pass filter 40, which expands the signal supplied by subtracter 35 without, however, the width of the thus obtained signal D, shown in FIG. 6d, exceeding that of the video signal v (FIG. 6a).

The output of the low-pass filter 40 is connected to the input of a black clipping circuit 41 for eliminating negative signals. The output of circuit 41 is connected on the one hand to the negative input 42 of subtractor 37 and on the other hand to the input of a gamma correction circuit 43. The output of subtractor 37 is connected to the input of another gamma correction circuit 44.

A background signal $v_1$ for supplying tube 16 is obtained at the output of circuit 43. A contour signal $v_2$ for supplying tube 17 is obtained at the output of circuit 44. The signal E at the output of subtracter 37 is shown in FIG. 6e. In the operating example shown in FIGS. 6a to 6e, the video signal A has a rising front 45, is constant between times $t_1$ and $t_2$ (line 46) and then has a falling front 47 after time $t_2$.

Thus, signal B (FIG. 6b) at the output of circuit 33, which is the absolute value of the derivative of signal A, has two pulses 45b, 47b corresponding to the fronts, respectively 45 and 47, and these pulses are separated by a zero value signal 46b. Thus, signal C at the output of subtractor 35 is in the form of a constant signal 46c between times $t_1$ and $t_2$, said signal becoming zero before $t_1$ and after $t_2$.

The low-pass filter 40 makes it possible to include the rising and falling fronts of signal 46c. Thus, signal D at the output of filter 40 has a central part 46d with a constant value and rising and falling signals 45d, 47d respectively, which extend over finite periods, signal 45d having half the value of that of signal 46d at time $t_1$ and, in the same way, signal 47d has essentially half the value of that of signal 46d at time $t_2$. Signal D represents the background.

Signal E at the output of subtracter 37 (FIG. 6e) is formed by the difference between signal A and signal D. Signal E represents the contour signal and has a central low level part 46e and terminal parts 45e and 47e.

Reference will now be made to FIG. 7 and to FIGS. 8a and 8e. In this example, the background signal is obtained by scanning and not by extracting the contours. The brightness level for a point is determined by the minimum brightness in a small area surrounding that point. The video signal v is applied to the input of a reverse gamma correction circuit 50. Signal A at the output thereof is proportional to the brightness.

The output signal of circuit 50 is applied to the input of a delay element 51, which delays the signal applied to its input by a time $\Delta t_1$ of e.g. 150 nanoseconds. The output of circuit 50 is also connected to the first input 52 of a comparator 53, as well as to the input of a rephasing circuit 54, constituted by another delay element of duration $\Delta t_2$.

The output of element 51 is connected to a second input 55 of comparator 53 via another delay element 56 of duration $\Delta t_1$, as well as to the third input 57 of said comparator 53.

The output of comparator 53 is connected on the one hand to the first input 58 of another comparator 59, via a delay element 60, which delays the signal applied to its input by the scanning time H of one line, and on the other hand directly to the second input 61 of comparator 59.

The output of comparator 59 is connected to the input of a gamma correction circuit 62 via a low-pass filter 63, a white clipping circuit 64 and an attenuator 65, which are all arranged in series.

The output of the rephasing circuit 54 is connected to the positive input 66 of a subtracter 67, whose negative input 68 is connected to the output of attenuator 65. The output of subtractor 67 is connected to the input of the second gamma correction circuit 69.

The signal $v_1$ at the output of circuit 62 constitutes the background signal for supplying tube 16, while signal $v_2$ at the output of circuit 69 constitutes the contour signal supplying tube 17.

Comparator 53 is such that it supplies at its output whichever of the signals applied to its inputs has the lowest brightness level. In the same way, whichever of the signals applied to inputs 58 and 61 which has the lowest brightness is applied to the output of comparator 59. Thus, a comparison is made of the brightness of three points of the current line and one point of the preceding line. It is obviously possible for use for this procedure a larger number of points and/or lines.

FIG. 8a shows a signal A at the output of circuit 50, which is identical to the signal of FIG. 6a. FIG. 8b shows signal B at the output of comparator 59. It should be noted that the rising front 70b of this signal is delayed by $2\Delta t_1$ compared with the rising front 70 of signal A.

Signal C of FIG. 8c is the signal at the output of attenuator 65. It differs from signal B by the fact that its rising and falling fronts 70c and 71c respectively are spread out more in time than the corresponding fronts of signal B. FIG. 8d shows signal D at the output of the rephasing circuit 54. This signal D corresponds to signal A delayed by $\Delta t_2$, which is the sum of $\Delta t_1$ and the delay supplied by the low-pass filter 63.

Finally, signal E shown in FIG. 8e, is the difference between signals D and C, i.e. between the complete video signal and the background signal. Thus, it is the contour signal with, in the present example, a low level central part 72e surrounded by peaks 70e, 71e forming contours.

Circuits 64 and 65 make it possible to balance the mean power dissipated by each of the tubes 16, 17. In the example, use is simultaneously made of a white clipping circuit 64 and an attenuator 65 but, as a variant, it is possible to use either circuit 64 only, or circuit 65 only.

If circuit 64 is used without the attenuator 65 (or if $K=1$) for low brightness levels, tube 16 restores the background of the image and tube 17 only restores the sharp contours. For high brightness levels, as the power of tube 16 is limited, tube 17 helps to supply the background (as is the case for signal 72e in FIG. 8e).

If attenuator 65 is used alone (K<1), the background is in all cases restored by the two tubes. If the coefficient is slightly above 0.5, the mean power levels dissipated by the two tubes will then be balanced.

It is also possible to combine circuits 64, 65 in a manner different from that shown in FIG. 1, the type of combination depending on the desired distribution of the powers on tubes 16 and 17.

Regardless of the embodiment adopted, the disadvantages resulting from superimposing images from two tubes having identical video signals (as described in connection with FIGS. 2b to 2d) will not be encountered with the apparatus according to the invention.

FIG. 9 shows an embodiment of comparator 59 (FIG. 7). The input 58 is connected to the anode of a diode 75, whose cathode is connected to ground via a current generator 76. The cathode of diode 75 is also connected to the cathode of another diode 77.

In the same way, input 61 is connected to the anode of a diode 78, whose cathode is connected to ground via a current generator 79. The cathode of diode 78 is also connected to the cathode of another diode 80.

The anodes of diodes 77 and 80 are connected together, as well as to the output 81 of comparator 59. This output 81 is also connected, via a resistor 82, to a positive potential source $+V_O$. The lowest potential from among those applied to inputs 58 and 61 appears at output 81.

In the embodiments described hereinbefore in connection with FIGS. 5 and 7, use is made of low-pass filters 40 or 63 for forming the background signal with a view to supplying tube 16. The low-pass filtering could be wholly or partly performed by a defocusing of tube 16 and/or lens $16_1$. Apart from the simplification of the processing circuit, this arrangement has the advantage of permitting the use of lesser quality and therefore inexpensive tube 16 and lenses $16_1$. It is also possible to choose a green phosphor with a broader emission spectrum than that of the presently used phosphors and with a better electro-optical characteristic, i.e. with a better efficiency (ratio of the intensity of the electron beam to the brightness of the image), a better thermal behaviour and a better streaking characteristic.

This advantage results from the fact that, hitherto, the choice of the green phosphor has been limited by the projecting lens. As the latter was not corrected against chromatic aberrations, it was necessary to use a narrow spectrum phosphor to obtain an image with a good resolution. A lower resolution is not prejudicial to the background signal. In other words, the addition of a tube for increasing the brightness of the image does not lead to a significant increase in the cost of the apparatus.

It is obvious that the contour signal can be subject to further known processings, with the object of improving the appearance of the picture, such as a threshold or "coring", which eliminates the noise of the contour signal and/or an amplification of a signal to artificially increase the resolution of the image.

The invention is not limited to using two or more tubes producing green images. It is also possible to use several red and/or blue tubes. One possible embodiment would be to use two tubes to reproduce the background and one tube the contour.

Reference will now be made to FIGS. 10 and 11, which refer to an embodiment in which two standard commercially available video projectors are coupled together. The advantage of this construction compared with that described hereinbefore is that only a very small number of modifications are required to existing equipment. Moreover, better reliability is obtained, because if one of the two video projectors fails, the other can function alone.

As in the previously described embodiments, it is possible to supply a background signal to one of the video projectors and a contour signal to the other video projector. However, it is preferable to extract the image background signal solely from the luminance signal Y, while not subjecting signals R-Y and B-Y to said treatment.

In the example of FIG. 10, the matrixing circuit 103 of the first video projector 101 receives at its brightness or luminance input 104, a signal Y' constituting the output signal of a contour accentuation signal 105, whose input receives the luminance signal Y. The two other inputs 106, 107 of matrixing circuit 103 in a conventional manner receive signals B-Y and R-Y. In a known manner, red, green and blue signals $R_1$, $G_1$ and $B_1$ respectively are received at the outputs of circuit 103.

The luminance input 109 of matrixing circuit 108 of the second video projector 102 also receives the luminance signal Y by means of a low-pass filter 110. Thus, input 109 of matrixing circuit 108 receives a signal $Y_1$, which represents a signal without fine details. To take account of the delay caused by the low-pass filter 110, the two other inputs 111 and 112 of matrixing circuit 108 receive the signals B-Y and R-Y by means of delay elements 113 and 114, respectively. In a conventional manner, the matrixing circuit 108 has three outputs supplying red, green and blue signals $R_2$, $G_2$ and $B_2$ respectively.

In a simplified variation, input 104 of circuit 103 directly receives the luminance signal Y, i.e. no contour accentuation circuit 105 is provided.

The circuit of FIG. 10 has the advantage of being very simple. However, its contrast is not always satisfactory, because the video projector 102 in the fine detail areas projects a uniform area, which is superimposed on the fine details restored by video projector 101. The processing circuit of FIG. 11 is preferable for the purpose of obtaining better contrast.

In this final example, the signals supplied to the video projector 101 are the same as in the case of FIG. 10 and the processing of luminance signal Y prior to its application to the corresponding luminance inputs 104, 109 of matrixing circuits 103, 108 is carried out in the same way as in FIG. 7. However, unlike in the latter, there is no gamma correction, i.e. in the case of FIG. 11, circuits 50, 62 and 69 have been omitted.

Thus, the output of attenuator 65 is directly connected to the input 109 of circuit 108 and the output of subtracter 67 is directly connected to the input 104 of matrixing circuit 103. In the same way, luminance signal Y is directly applied to the input of delay element 51 and to the input of the delay element 54.

As in the case of FIG. 10, delay elements 113, 114 are provided in the connection between inputs B-Y and R-Y and inputs 111 and 112 of matrixing circuit 108 of video projector 102. In order not to disturb the colours of the image supplied by the second video projector 102, due to the processing bringing about a background signal, where the contours are eliminated, there is a corresponding attenuation of the colour difference signals R-Y and B-Y applied to the matrixing circuit 108. To this end, a variable gain amplifier 115 is provided between delay element 113 and input 111 of circuit 108.

In the same way, another variable gain amplifier 116 is placed between delay element 114 and input 112 of circuit 108. The control signal of the gain of amplifiers 115 and 116 is supplied by the output $\Delta Y_1$ of a subtracter 117, whose first input 118 receives the luminance signal Y and the second input 119 receives the brightness background signal $Y_1'$, like input 109 of matrixing circuit 108. Signal $\Delta Y_1$ is therefore the difference between the luminance signal and the background signal and has a high value at the contours. The higher this signal, the lower the gain of amplifiers 115 and 116.

In the examples of FIGS. 10 and 11, as in the two other embodiments, the contours can be artificially increased in the first video projector 101 to compensate for the absence of contours supplied by the second video projector 102. It has been found that an increase in the level of the contours of approximately 3 decibels is sufficient.

Finally, with regards to FIGS. 10 and 11, there is preferably a mode selector formed by switches, not shown, making it possible either to supply the signals R-Y, B-Y and Y to the inputs of the matrixing circuits 103, 108, as described relative to FIGS. 10 and 11, or to directly supply these signals to the corresponding inputs of circuit 103 only, or to directly apply these signals Y, B-Y and R-Y to only the corresponding inputs of circuit 108.

What is claimed is:

1. A video image projection system comprising at least two projecting devices for projecting superimposed images onto a projection surface, and a circuit for processing a video signal representative of an image to be projected to supply a background signal to one of said projecting devices for projecting a background component without fine details of the image, said processing circuit comprising a scanning circuit for selecting a lowest brightness value from brightness values of a point of the image to be projected and of points in a predetermined area around said point, and means for converting said lowest brightness value into the background signal supplied to the one projecting device for projecting said background component.

2. The system according to claim 1 wherein the video signal processing circuit supplies a contour signal to another of said projecting devices for projecting sharp contours of the image, said contour signal being complementary to said background signal.

3. The system according to claim 2, wherein said processing circuit further comprises means for supplying power to be used by each of said projecting devices projecting said background component and sharp contours, whereby said devices use the same amount of power when projecting highlight areas of the image, and said background projecting device uses more power than said device for projecting said contours when projecting areas of the image having light levels lower than said highlight areas.

4. The system according to claim 2, further comprising a delay element for rephasing said video signal with said background signal, and a subtracter for subtracting said background signal from the rephased video signal to produce said contour signal.

5. The system according to claim 1 wherein at least two of said projecting devices project monochromatic images of the same color.

6. The system according to claim 5, wherein said same color is green.

7. The system according to claim 6, wherein said projecting devices are cathode ray tubes, and said cathode ray tube for projecting the background component of the image has a green phosphor with a wide emission spectrum.

8. The system according to claim 5, wherein said projecting devices comprise four cathode ray tubes, wherein two of said tubes project images of the same color, said two tubes being juxtaposed and having their axes parallel to one another and to the axes of corresponding lenses, and wherein the axes of said two tubes are displaced relative to the axes of said corresponding lenses so that the images projected by said two tubes converge on the projection surface.

9. The system according to claim 8, wherein the axes of the other two of said four cathode ray tubes lie in the same plane as the axes of the two tubes which project the same color and are inclined relative to said axes of the two tubes which project the same color in order to ensure convergence of the four images on the projection surface.

10. The system according to claim 1, wherein said projecting device for projecting the background component of the image projects defocused image.

11. The system according to claim 1, wherein said scanning circuit comprises delay elements.

12. The system according to claim 1, wherein said scanning circuit comprises comparators for selecting the lowest brightness value by comparison between the brightness value of the point to be projected, the brightness value of at least one preceding point on the same scanning line and the brightness value of at least one point on a preceding scanning line.

13. The system according to claim 12, wherein said converting means comprises a low-pass filter connected to the comparators.

14. The system according to claim 1, wherein said converting means comprises a high level signal clipping circuit for processing said background signal.

15. The system according to claim 1, wherein the converting means comprises an attenuator for processing said background signal.

16. The system according to claim 1, wherein said at least two projection devices each comprise a video projector.

17. The system according to claim 16, wherein said processing circuit produces a background signal from a luminance component of a video signal supplied to said video projectors.

18. The system according to claim 17, wherein said processing circuit produces a contour signal representing sharp contours of the image to be projected from the luminance component and supplies the contour signal to another of said video projectors, and wherein color difference components R-Y and B-Y of the video signal are not affected.

19. The system according to claim 17, wherein color difference components (R-Y, B-Y) of the video signal are applied to corresponding inputs of a matrixing circuit corresponding to said one of said video projectors via variable gain amplifiers, the gain of which is varied as a function of the difference between the luminance signal and the background signal.

20. The system according to claim 16, further comprising a mode selector for selecting the use of either all of said video projectors linked by said processing circuit, or the use of any one of said video projectors alone.

* * * * *